July 1, 1930.                  H. V. REED                 1,768,997
                              CLUTCH PLATE
                           Filed March 7, 1929
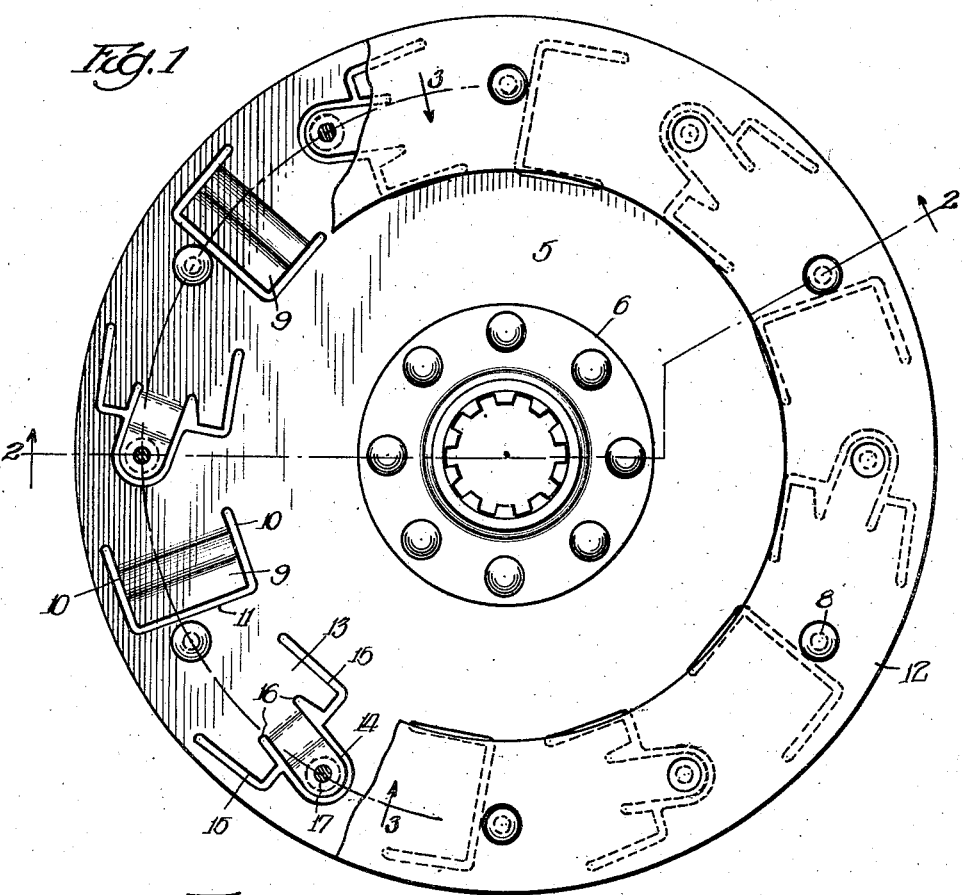
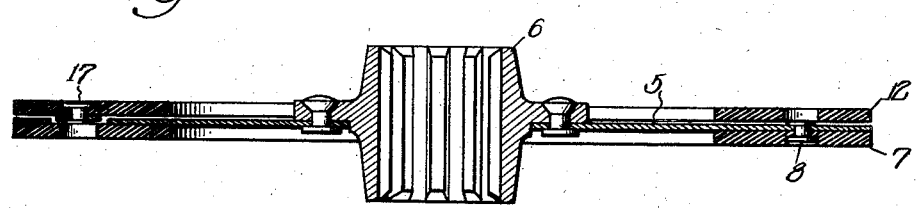
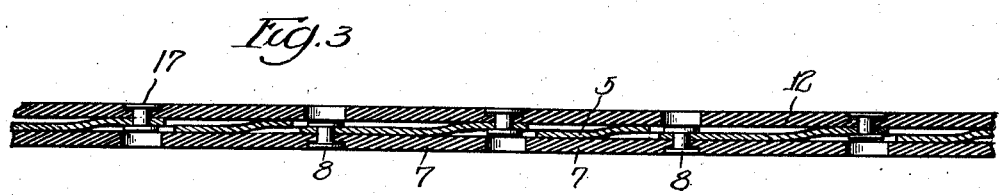
Inventor
Harold V. Reed
By Wm. O. Belt Atty Patented July 1, 1930

1,768,997

UNITED STATES PATENT OFFICE

HAROLD V. REED, OF CHICAGO, ILLINOIS, ASSIGNOR TO THE BORG & BECK COMPANY, OF CHICAGO, ILLINOIS, A CORPORATION OF ILLINOIS

CLUTCH PLATE

Application filed March 7, 1929. Serial No. 345,142.

This invention relates to friction clutches of the kind wherein a friction plate is interposed between two parts of a driving member and is adapted to be gripped or clamped by the parts under sufficient pressure to impart movement from the driving member to the driven member of the clutch. The invention is particularly desirable in a friction clutch for automotive vehicles.

The object of the invention is to provide a novel clutch plate having friction rings which will take hold smoothly and evenly throughout their contact area when pressure is initially applied and by yielding but rapid progressive action make the clutch act quickly and efficiently without grabbing or jerking.

Another object of the invention is to provide a novel clutch plate with continuous friction rings and to make full engagement between the friction rings and the driving members throughout the application of pressure whereby to secure maximum efficiency in a rapid progressive movement and without uneven wear on the rings.

And a further object of the invention is to provide a clutch plate with a relatively fixed friction ring and with a movable friction ring which is yieldingly supported in a novel manner to move bodily and progressively under clutch pressure towards the fixed friction ring to provide a soft and smooth clutch action.

In the accompanying drawings I have illustrated a selected embodiment of the invention, and referring thereto Fig. 1 is a side elevation of the clutch plate showing one of the friction rings partly broken away.

Fig. 2 is a sectional view on the line 2—2 of Fig. 1.

Fig. 3 is a sectional view on the line 3—3 of Fig. 1.

Referring to the drawings, the clutch plate comprises a disk 5 mounted on a hub 6 and provided with a friction ring 7 which is secured flat against one side of the plate by rivets 8 or other suitable fastening devices. The disk is provided with a plurality of wings 9 spaced apart annularly within the periphery of the disk and all extending in the same direction. Each wing is struck from the disk and in the form illustrated, the side slits 10 are substantially parallel and normal to the front slit 11. These wings 9 are bent outward or off-set to support the friction ring 12 which is arranged on the opposite side of the disk to the ring 7. Other wings 13 are struck from the disk and alternate with the wings 9 and also extend annularly within the periphery of the disk and in the same direction. Each of these wings 13 has a tongue 14 at its outer end, and side lips 15 are formed by re-entrant slits 16 between the lips and the tongue. The tongues and the lips are bent outward or off-set to support the friction ring 12 and the latter is fastened to the tongues at the ends thereof by rivets 17 or other suitable fastening means. In the form shown the tongues are angularly disposed with relation to the wings so that the rivets 17 may lie with the rivets 8 in the same line concentric with the periphery of the disk. The friction rings are continuous, the ring 7 being rigidly fastened flatly to one side of the disk and the ring 12 being fastened rigidly to the tongues 14 but supported by the tongues and the lips 15 and the wings 9 yieldingly in off-set relation to the disk. Under application of pressure in a clutch installation the friction ring 12 will yield gradually to provide a progressive clutch action which eliminates jerking and grabbing. Under the application of pressure the friction rings make full engagement with contacting parts whereby the clutch action is comparatively rapid but at the same time soft and free from objectionable grabbing. This full engagement gives the maximum friction effect and also provides for uniform wear of the rings. All of the yielding supporting parts for the friction ring 12 will be simultaneously compressed. The tongues are more resilient than the wings 9 and since the ring 12 is fastened to the ends of the tongues any tendency of the ring to shift annularly will be permitted by the tongues. The invention provides a clutch plate having two continuous friction facing rings, one of these rings being flatly and rigidly fastened on one side of the disk and the other being yieldingly supported in off-set position on the other side of the disk, this yieldingly supported ring being also, in effect, yieldingly fastened to the disk through the medium of the extended or elongated tongues which not only function to yieldingly support the ring but also yieldingly connect the ring with the body of the disk by enabling a limited annular movement of the ring relative to the disk without loosening or shearing the fastening devices by which the ring is fastened to the tongues.

I have shown the invention in a simple form suitable for embodiment in an automotive clutch but I reserve the right to make all such changes in the form, construction and arrangement of parts as may be necessary or desirable to adapt the invention for other clutches, or for other purposes and within the scope of the following claims:

I claim:

1. A clutch plate comprising a disk having a plurality of wings off-set on one side thereof, spaced apart within the periphery of the disk and all extending annularly in the same direction, a friction ring arranged on the disk over said wings, and means embodying a portion unitary with the disk and independent of the wings for connecting the ring to the disk.

2. A clutch plate comprising a disk having a plurality of wings off-set on one side thereof, spaced apart within the periphery of the disk and all extending annularly in the same direction, a friction ring arranged on the disk over said wings, and means located between the wings and connecting the ring with the disk.

3. A clutch plate comprising a disk having a plurality of wings off-set on one side thereof, spaced apart within the periphery of the disk and all extending annularly in the same direction, a friction ring arranged on the disk over said wings, and tongues on the disk alternating with the wings and forming with the wings a yielding support for the ring.

4. A clutch plate comprising a disk having a plurality of wings off-set on one side thereof, spaced apart within the periphery of the disk and all extending annularly in the same direction, a friction ring arranged on the disk over said wings yielding tongues on the disk alternating with the wings, and means fastening said ring to said tongues.

5. A clutch plate comprising a disk having a plurality of wings off-set on one side thereof, spaced apart within the periphery of the disk and all extending annularly in the same direction, a friction ring arranged on the disk over said wings, yielding tongues on some of said wings, and means fastening said ring to said tongues.

6. A clutch plate comprising a disk having a plurality of wings off-set on one side thereof, spaced apart within the periphery of the disk and all extending annularly in the same direction, a friction ring arranged on the disk over said wings, yielding tongues on alternating wings, and means fastening said ring to said tongues.

7. A clutch plate comprising a disk having a plurality of wings off-set on one side thereof, spaced apart within the periphery of the disk and all extending annularly in the same direction, a friction ring arranged on the disk over said wings, some of said wings having yielding tongues and lips thereon, and means fastening said ring to said tongues.

8. A clutch plate comprising a disk having a plurality of wings off-set on one side thereof, spaced apart within the periphery of the disk and all extending annularly in the same direction, a friction ring arranged on the disk over said wings, some of said wings having yielding tongues and yielding lips at the sides of said tongues, and means fastening said ring to said tongues.

9. A clutch plate comprising a disk having a plurality of wings off-set on one side thereof, spaced apart within the periphery of the disk and all extending annularly in the same direction, a friction ring arranged on the disk over said wings, some of said wings having yielding tongues and yielding lips at the sides of said tongues, there being re-entrant slits between each tongue and its lips, and means fastening said ring to said tongues.

10. A clutch plate comprising a disk having a plurality of wings off-set on one side thereof, spaced apart within the periphery of the disk and all extending annularly in the same direction, a friction ring arranged on the disk over said wings, alternate wings having yielding tongues and lips, and means fastening said ring to said tongues.

HAROLD V. REED.